Figure 1:
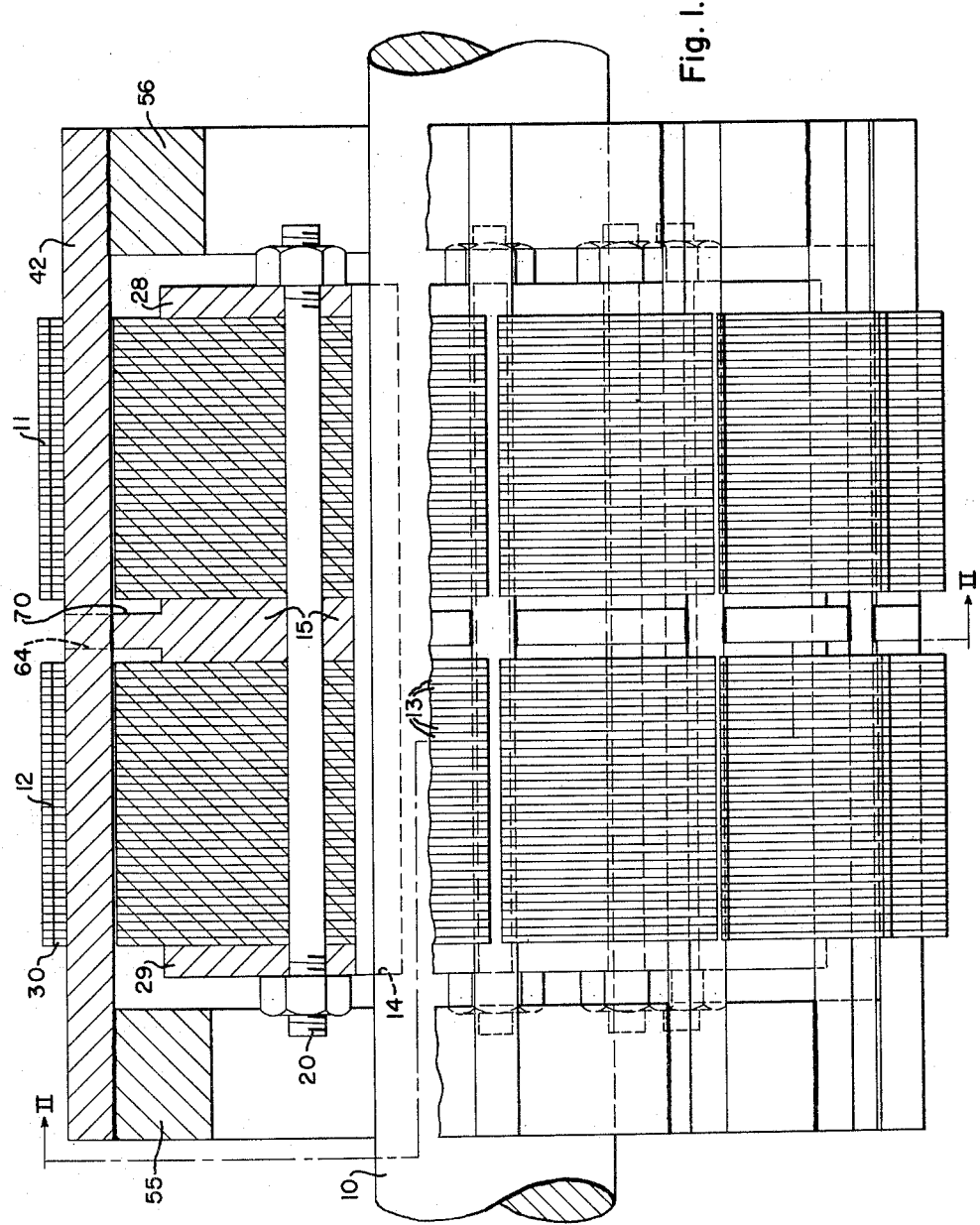

July 13, 1965

L. B. LYNN 3,194,996

INDUCTION MOTOR ROTOR

Filed March 19, 1963

2 Sheets-Sheet 1

WITNESSES:
John G. Chopp
James F. Young

INVENTOR
Lawrence B. Lynn
BY
Francis T. Blake
ATTORNEY

United States Patent Office 3,194,996
Patented July 13, 1965

3,194,996
INDUCTION MOTOR ROTOR
Lawrence B. Lynn, Buffalo, N.Y., assignor to Westinghouse Electric Corporation, Pittsburgh, Pa., a corporation of Pennsylvania
Filed Mar. 19, 1963, Ser. No. 266,391
1 Claim. (Cl. 310—211)

The present invention relates to electric induction motors, and more particularly to an improved squirrel-cage rotor construction for an induction motor.

In one well-known type of squirrel-cage rotor, the rotor cage consists of conductor bars lying in the peripheral slots of the rotor core and brazed at their ends to resistance rings. The bars and rings are usually made of a copper alloy to obtain the desired conductivity. The melting temperatures of the alloys and brazing materials used are relatively high, as compared to the melting temperatures of the aluminum alloys used in die cast rotors, and brazed rotors can withstand considerably higher temperatures than die cast rotors. Brazed rotors are used, therefore, where frequent overloads or stalled conditions may occur, and for other applications where severe heating of the rotor cage may occur, such as where the motor is frequently reversed. With the conventional construction of brazed squirrel-cage rotors, however, there is a tendency for the rotor to fail after a relatively few operating cycles of wide temperature range, and it has been found that these failures are due to fatigue fractures of the conductor bars resulting from high bending stresses caused by centrifugal forces, or thermal expansion of the resistance rings, or both.

In a squirrel-cage rotor in which the conductor bars are free to move radially in the slots, the centrifugal force upon acceleration of the motor loads the bars uniformly throughout their length. Since the bars are restrained at their ends by their attachment to the resistance rings, they tend to bow outward at the center causing bending stresses in the bars, with maximum stresses at the ends which can easily exceed the yield strength of the material. If the bars are tight in the slots, the centrifugal loading is taken by the rotor core but thermal expansion of the rings causes very high bending stresses in the short sections of the bars between the ends of the core and the adjacent resistance rings. This is because the cage winding reaches much higher temperatures than the core and the rings have a higher coefficient of thermal expansion than the core. The radial termal expansion of the rings therefore causes severe bending stresses at the ends of the bars. In some cases, both centrifugal and thermal effects may occur and since they do not occur at the same time, the bars are subjected to two cycles of bending stress, in opposite directions, for each operating cycle.

It is the principal object of the present invention to provide an induction motor of the squirrel-cage type having an improved rotor construction that will withstand heavy duty usage without fatigue of the rotor cage members.

Another object of the present invention is to provide an improved squirrel-cage rotor construction for an induction motor in which the conductor bars are supported in relation to the rotor core and the resistance rings in a manner to minimize or substantially eliminate bending stresses in the conductor bars due to centrifugal forces and thermal expansion.

In accordance with the invention, the rotor structure is provided with a support member intermediate its ends extending towards the periphery of the rotor. The conductor bars which are positioned in axial slots about the periphery of the rotor body are secured to the aforesaid support member by brazing or the like and are additionally secured at their respective ends to respective resistance rings of electrically conductive material. Both the support member intermediate the ends of the rotor magnetic structure and the resistance rings are preferably formed of materials having substantially the same coefficients of thermal expansion. Since the conductor bars are each secured to the support member intermediate the ends of the rotor core, they are axially positioned within the rotor slots and they are centrally supported in a manner to minimize bowing of the conductor bars between their ends. Radial clearance is provided in each of the rotor slots in which the respective conductor bars are positioned so that radial movement of the conductor bars in response to expansion of the resistance rings and the central support member is permitted within the rotor slots without imposing undesirable bending strains or stresses on the conductor bars.

Figure 2:
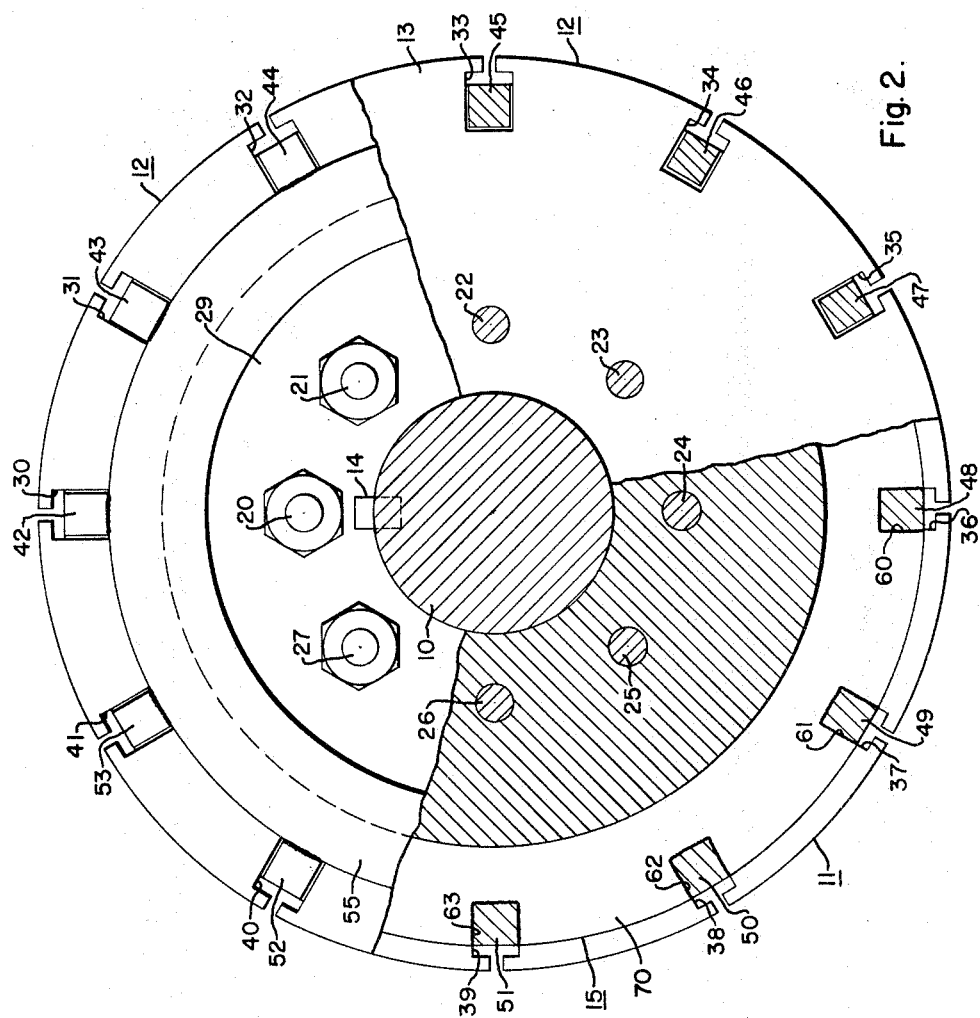

Other objects, features and the attendant advantages of the invention will be apparent with reference to the following specification and drawings, in which:

FIGURE 1 is a side elevation, partly in section, of the rotor construction of the invention; and FIG. 2 is an end elevation partly sectioned through the rotor body and the central support members intermediate the ends of the rotor body.

Referring to the drawings, the induction motor rotor is carried by the motor shaft 10 and includes spaced magnetic core sections 11 and 12 each formed of a plurality of laminations of punched magnetic material, such as the lamination 13, keyed to the shaft 10 at the keyway 14, or otherwise secured to the shaft. A circular support member 15 is positioned in the space between the core sections 11 and 12 intermediate the ends of the rotor core structure formed by the afoersaid core sections. The entire magnetic structure including the stacked core laminations 11, 12 and the intermediate support member 15 is secured in an assembled relation by means of a plurality of bolts 20–27 and plates 28, 29, or in any other suitable or usual manner.

The divided magnetic core structure comprising the laminated sections 11 and 12 is formed with a plurality of peripheral axially extending slots such as shown at 30–41 to receive respective ones of the conductor bars 42–53 forming the rotor cage axial members.

Resistance rings 55 and 56 are secured to the ends of the conductor bars 42–53 adjacent the respective ends of the rotor core members 11 and 12. The conductor bars may be secured to the resistance rings 55 and 56 by brazing or the like. In accordance with the invention each conductor bar 42–53 is also secured by brazing or the like to a peripheral portion of the intermediate support member 15 between the core sections 11 and 12. In the preferred form of the invention, the support disc 15 and the resistance rings 55, 56 are formed of materials having essentially the same coefficients of thermal expansion, and may be made of the same material such as a copper alloy having the desired conductivity, although other suitable materials such as carbon steel might be used provided it can be made to have substantially the same coefficient of thermal expansion as resistance rings 55, 56. The conductor bars 42–53 may preferably be comprised of bronze or other copper containing alloys and may be secured to the resistance rings 55, 56 and the intermediate support disc 15 by brazing, welding or the like.

In the preferred arrangement, the intermediate support member 15 is provided with a plurality of peripheral slots, such as the slots shown at 60–64, in which the conductor bars 45–53 may be received. The root diameter of the peripheral slots in the intermediate support member 15 and the diameters of the outer peripheral surfaces of the resistance rings 55 and 56 are all approximately the same and are made slightly greater than the root diameters of the peripheral slots 30–41 in the stacks of rotor laminations 11 and 12 at room temperature. The radial depth of the slots 30–41 is made substantially greater than the radial thickness of the conductor bars, so that an appreciable radial clearance exists in the slots which is preferably made at least equal to the radial thermal expansion of the rings 55 and 56 at the highest expected operating temperature. The conductor bars can thus move radially in the slots and a slight average clearance is preferably provided between the bars and the sides of the slots to permit such movement.

It will be seen that a relatively stiff, self-supporting cage structure is thus provided in which the conductor bars are supported on the rings and intermediate support and are movable in the slots. The cage structure is positioned both axially and radially by the intermediate support which is clamped between the core sections. With this construction, bending stresses due to centrifugal forces are reduced to safe limits since the bars are restrained at their centers and the tendency to bow outward is minimized. The bars are free to expand axially in both directions from the center upon heating and can move radially in the slots with radial expansion of the rings. The intermediate support 15 is preferably of reduced thickness at its periphery, as indicated at 70, to permit free expansion, and if the rings and intermediate support expand equally upon heating, the conductor bars move radially with the rings with no bending stresses. Even if the rings and intermediate support do not expand exactly the same amount, because of differences in thermal expansion coefficient or differences in temperature, the resultant bending of the bars is very slight and causes only negligible bending stresses. Thus a structure is provided in which the bending stresses which led to fatigue fractures in conventional brazed rotors are substantially eliminated.

Although a specific form of disc support member 15 has been specifically described, it should be understood that it is within the purview of the invention to include other forms of intermediate support members for the conductor bars positioned intermediate the ends of the rotor core member, or in some cases the intermediate support might be omitted if the stresses due to centrifugal force are small enough. Also the invention is not limited to any particular size or number of conductor bars and resistance ring members, nor to a particular cross-sectional shape of conductor bars, or to the particular details of construction shown for the purpose of illustration.

I claim as my invention:

A rotor member for an induction motor comprising a laminated core member divided into two sections and having a plurality of peripheral slots, a disc support member clamped between the two sections of the core member and having a plurality of peripheral slots, the root depths of the slots of said sections of the core member being greater than the root depths of the slots of said disc member, a plurality of conductor bars disposed in the slots of the core member and fastened in the slots of said support member, and a resistance ring joined to the ends of the conductor bars at each end of the core member, the bars being supported by the support member and resistance rings, the radial depth of the slots in the sections of said core member being greater than the radial thickness of the conductor bars and the bars being movable radially and axially in the slots upon thermal expansion of the resistance rings and support member, said bars and said disc support member together with said resistance rings being comprised of materials having substantially the same coefficients of thermal expansion.

References Cited by the Examiner

UNITED STATES PATENTS

| 1,680,688 | 8/28 | Maxwell | 310—211 |
| 2,047,831 | 7/36 | Lund | 310—211 |
| 2,458,237 | 1/49 | Arnemo | 310—211 |
| 3,134,040 | 5/64 | Barth | 310—211 |

FOREIGN PATENTS

| 310,330 | 1/30 | Great Britain. |

MILTON O. HIRSHFIELD, *Primary Examiner.*